Figures 1, 4:
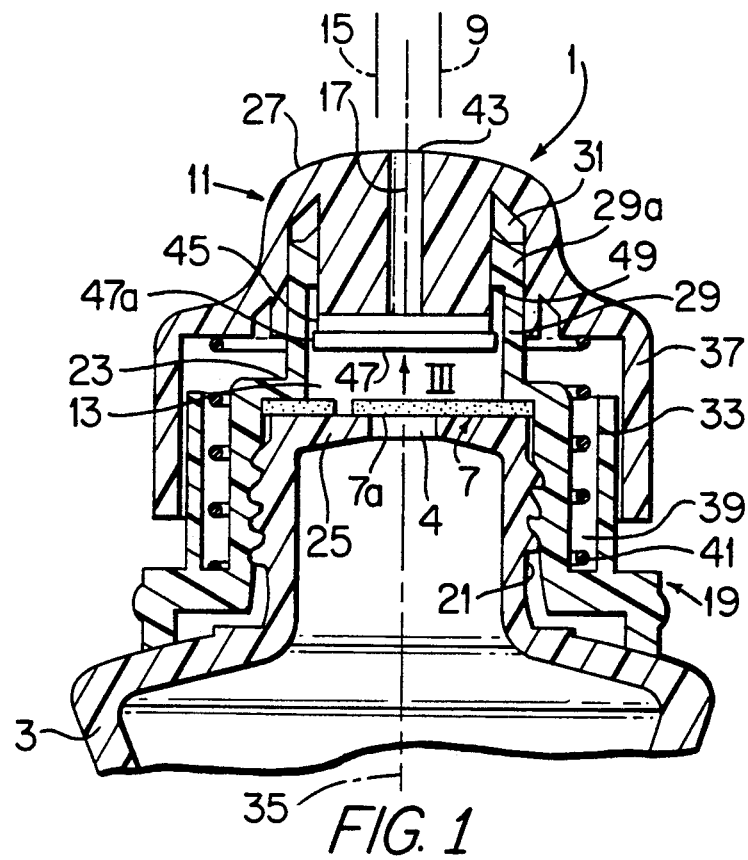

United States Patent [19]

Vandromme et al.

[11] Patent Number: 5,253,788
[45] Date of Patent: Oct. 19, 1993

[54] DEVICE FOR DISPENSING AND DOSING A PRODUCT, SUCH AS A COSMETIC PRODUCT, CONTAINED IN A RECEPTACLE

[75] Inventors: Michel Vandromme, Le Plessis Brion; Charles Pileur, Noyon, both of France

[73] Assignee: Yves Saint Laurent Parfums, Neuilly Sur Seine, France

[21] Appl. No.: 913,794

[22] Filed: Jul. 16, 1992

[30] Foreign Application Priority Data

Jul. 3, 1992 [FR] France .................. 92 08237

[51] Int. Cl.$^5$ .................................. B67D 5/42
[52] U.S. Cl. ......................................... 222/321
[58] Field of Search ............... 222/207, 321, 340, 531

[56] References Cited

U.S. PATENT DOCUMENTS

| | | | |
|---|---|---|---|
| 3,949,910 | 4/1976 | Focht | 222/321 |
| 4,410,107 | 10/1983 | Corsette | 222/321 |
| 4,518,105 | 5/1985 | Kucken et al. | 222/207 |
| 4,844,299 | 7/1989 | Sekiguchi | 222/94 |
| 4,941,598 | 7/1990 | Lambelet, Jr. | 222/321 |
| 5,042,694 | 8/1991 | Birmelin | 22/207 |

FOREIGN PATENT DOCUMENTS 073918 3/1983 European Pat. Off. .
3738792 4/1989 Fed. Rep. of Germany .

*Primary Examiner*—Jesus D. Sotelo
*Attorney, Agent, or Firm*—Pollock, VandeSande & Priddy

[57] ABSTRACT

Device for dispensing and dosing a product, comprising a first valve disposed across the aperture of the receptable; a slide system comprising a fixed part and a movable part including a piston sliding into a zone of said fixed part delimiting externally a dosing chamber, said piston having therethrough a passage for the communication of said dosing chamber with the outside; and a second valve associated with said piston for opening the communication between said dosing chamber and the outside when said piston slides down for compressing the product contained in said chamber and closing off said communication when the piston is slides up.

5 Claims, 7 Drawing Sheets

DEVICE FOR DISPENSING AND DOSING A PRODUCT, SUCH AS A COSMETIC PRODUCT, CONTAINED IN A RECEPTACLE

The invention relates to a device for dispensing and dosing a product, such as a cream, a gel or a milk, contained in a receptacle, such as a tube or a bag which can be relatively supple and having a product outlet aperture where the device is placed.

Today, various systems are known which serve to dispense or to dose one product or another, and this particularly in the field of household products or some more or less pasty food products.

But these existing systems have at least one of the following disadvantages:

if they are dispensers, these systems are not all dosers; and if they are dosers they do not necessarily provide a pumping of the product, from the receptacle towards the doser;

they are not necessarily provided with a non-return device preventing the product from returning into the receptacle when the dispensing system is operated, when they are not associated with a receptacle under pressure, they are not generally usable the right way up and the wrong way up alike, their leaktightness is often relative. Thus, the dispensing orifice often contains traces of product after use, if they are dosers, these dispensers do not systematically permit practical restitution in full of the intended dose of product.

The invention aims in particular to remedy these disadvantages at least in part.

To this effect, according to a first feature of the invention, the device envisaged comprises:

a first valve to be disposed across the aperture of the product receptacle, and a slide system associated with the said first valve so as, in a first movement of the said system, to develop a dosing chamber communicating with the said receptacle through the said valve, while allowing the product to pass from the receptacle to the dosing chamber, the said slide system occupying, at the end of the said first movement, a position closing off the access of the product contained in the chamber to a discharge passage connected to the outside of the said device, whereas at the time of a second movement of the said slide system which is the reverse of the first, the latter opens the access to the said discharge passage then allowing only the dispensing of the product to the outside by application of a pressure on the product contained in the said dosing chamber, thus forcing this product towards the said discharge passage, while prohibiting its return towards the receptacle by closure of the said first valve.

It will immediately be noted that such a device remedies practically all of the disadvantages noted above.

However, it will not necessarily offer a perfect pumping of the product from the receptacle to the dosing chamber.

That is why a second feature of the invention proposes, in order to reinforce the "pump" aspect of the device, to construct the latter so that it comprises:

a fixed part and a movable part forming the said slide system, the movable part penetrating locally into the fixed part so as to form therein a piston which is movable in the fixed part, this piston having passing through it the said passage for discharging the product to the outside, means for activating the said movable part tending naturally to activate the piston in the direction of the said first movement, and a second value associated with the said piston so as to open the communication between the dosing chamber and the outside (via the discharge passage) at the time of the said second movement of the piston and to close off this communication at the time of the said first reverse movement, thus creating, in the course of this first movement, a pumping effect, by suction towards the dosing chamber of the product contained in the receptacle.

Insofar as this product is capable of reacting on contact with the air, there is provided in the invention the possibility of adding a detachable cap comprising a stud adapted to blank off the product outlet end.

It will also be noted that, in order to prevent the filling of the dosing chamber with a dose of product too small to retain its properties for a long time without deterioration, it has also been envisaged that the slide system may have locally a bead for a forcible engagement of the abovementioned cap, driving and maintaining in second position (that is to say with a minimum chamber volume) the movable part of this same slide system.

The possibility is also provided of delivering a complete or partial dose of product. In addition, the principle of an axial or lateral dispensing has been taken into account.

Figure 2:
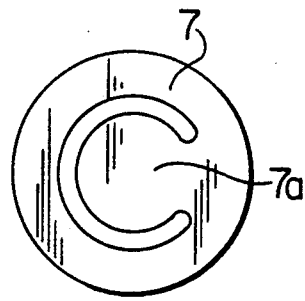
Figure 3:
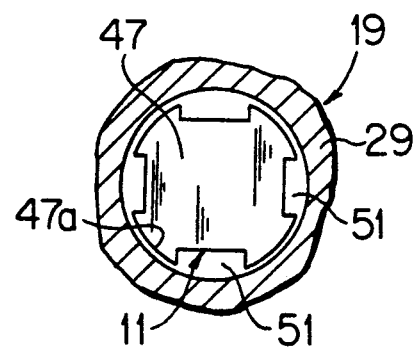
Figure 11:
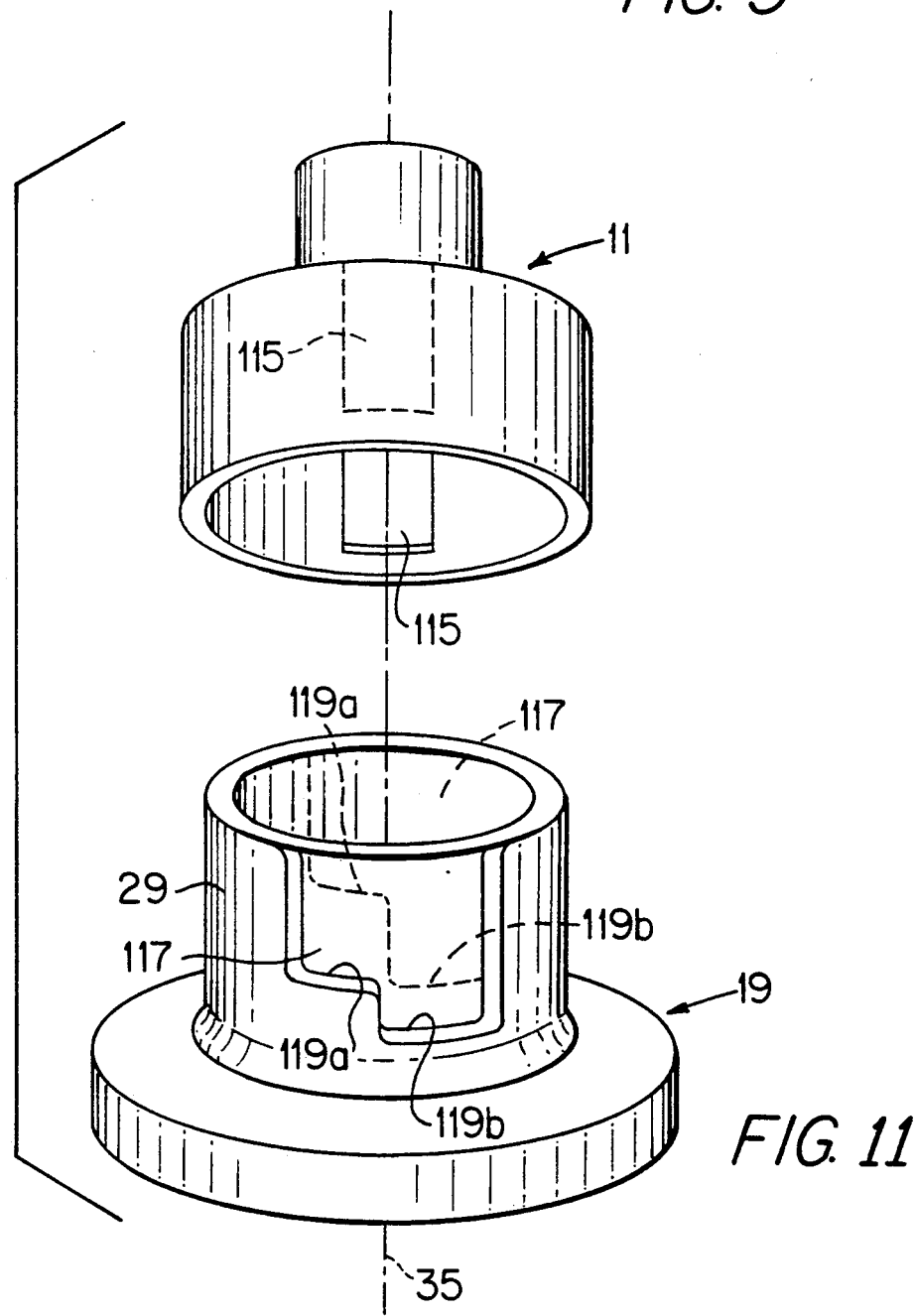
Figure 6:
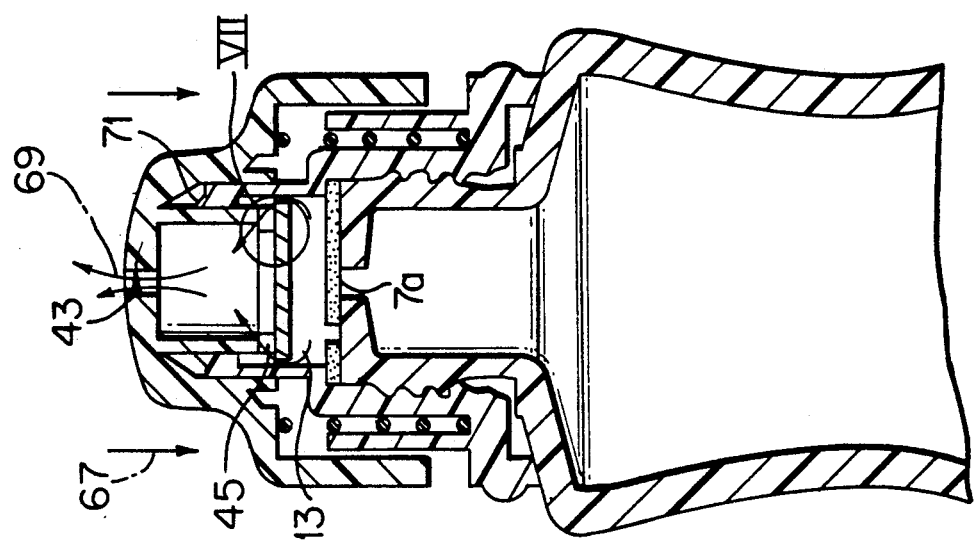
Figure 5:
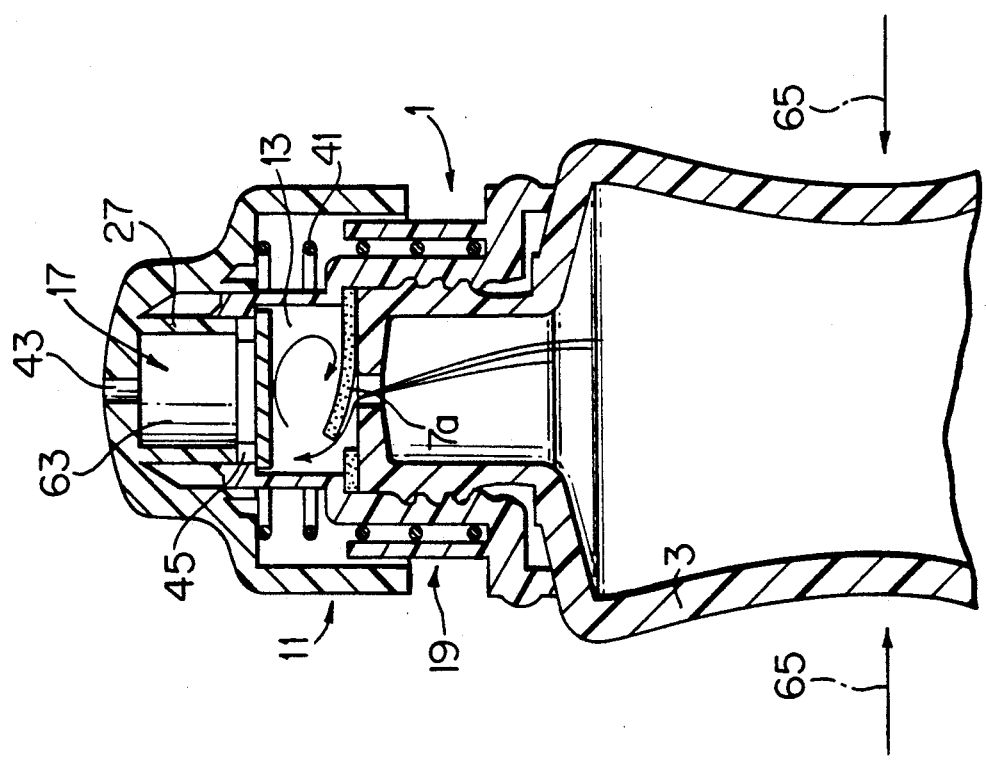
Figure 7:
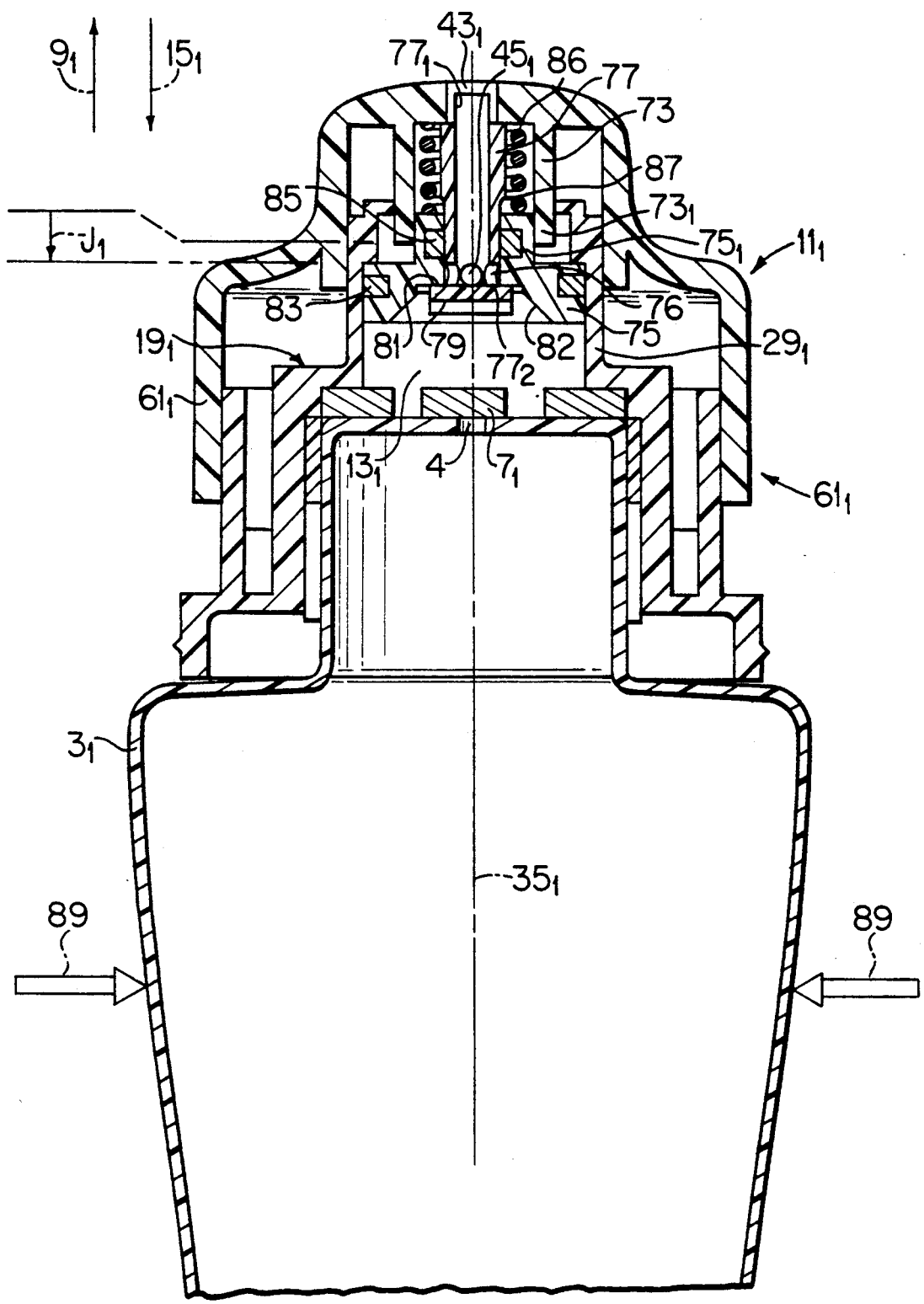
Figure 8:
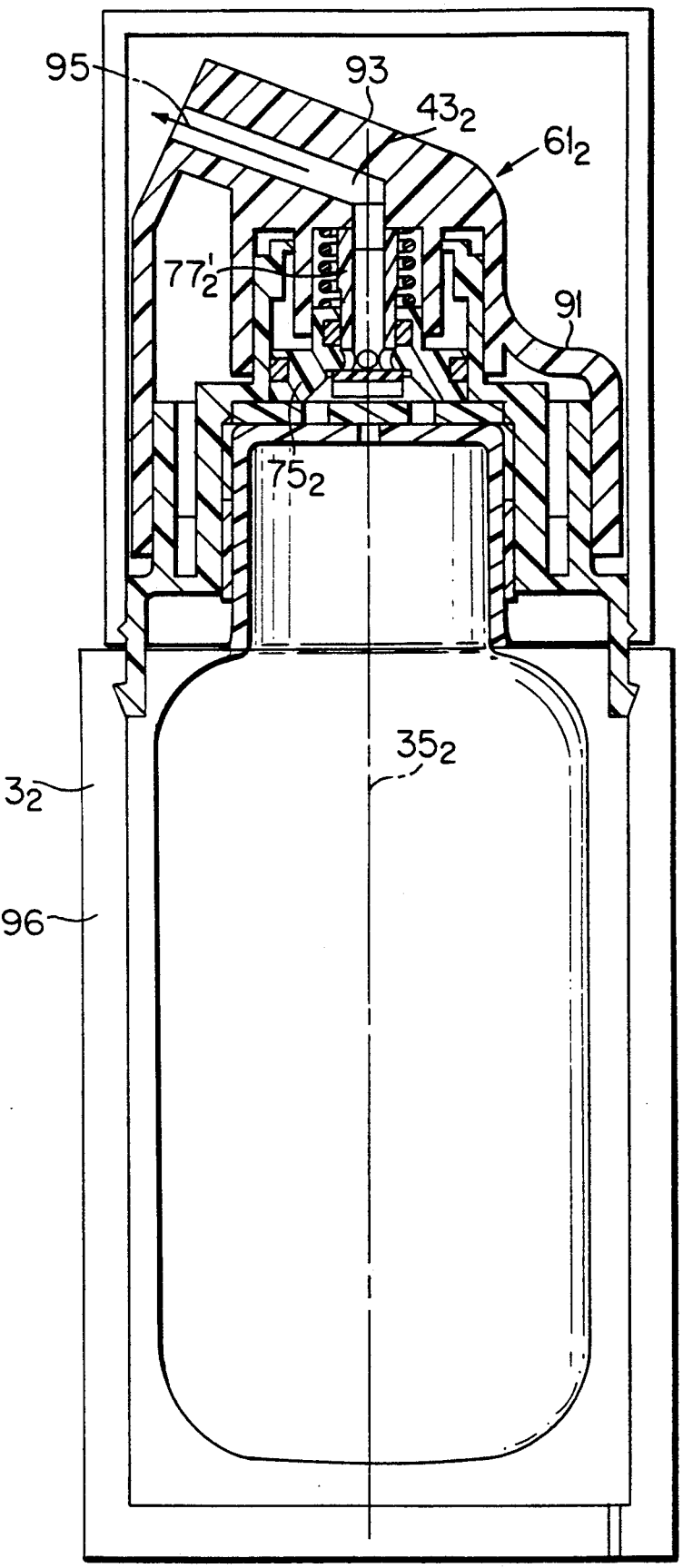
Figure 9:
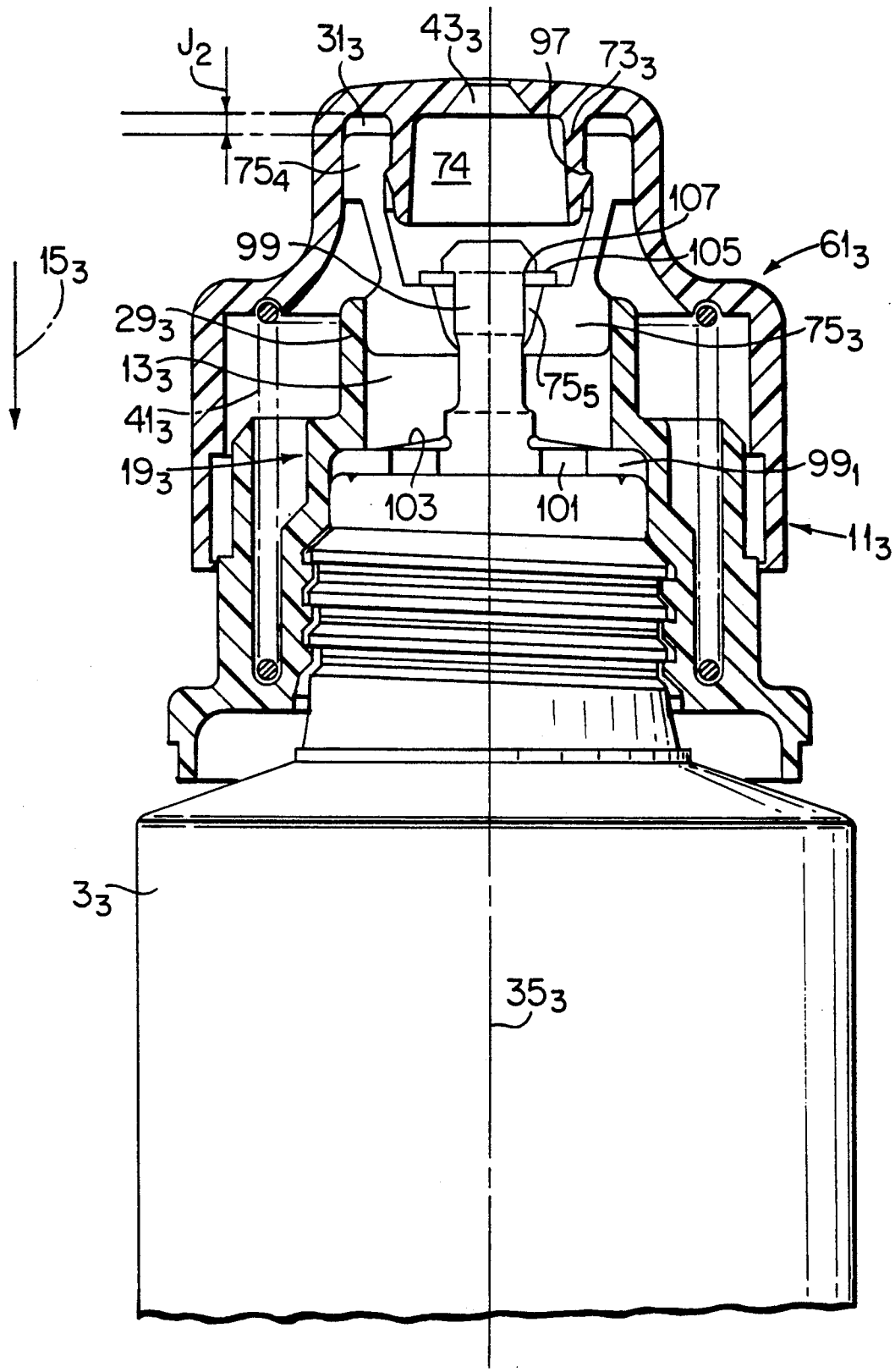
Figure 10:
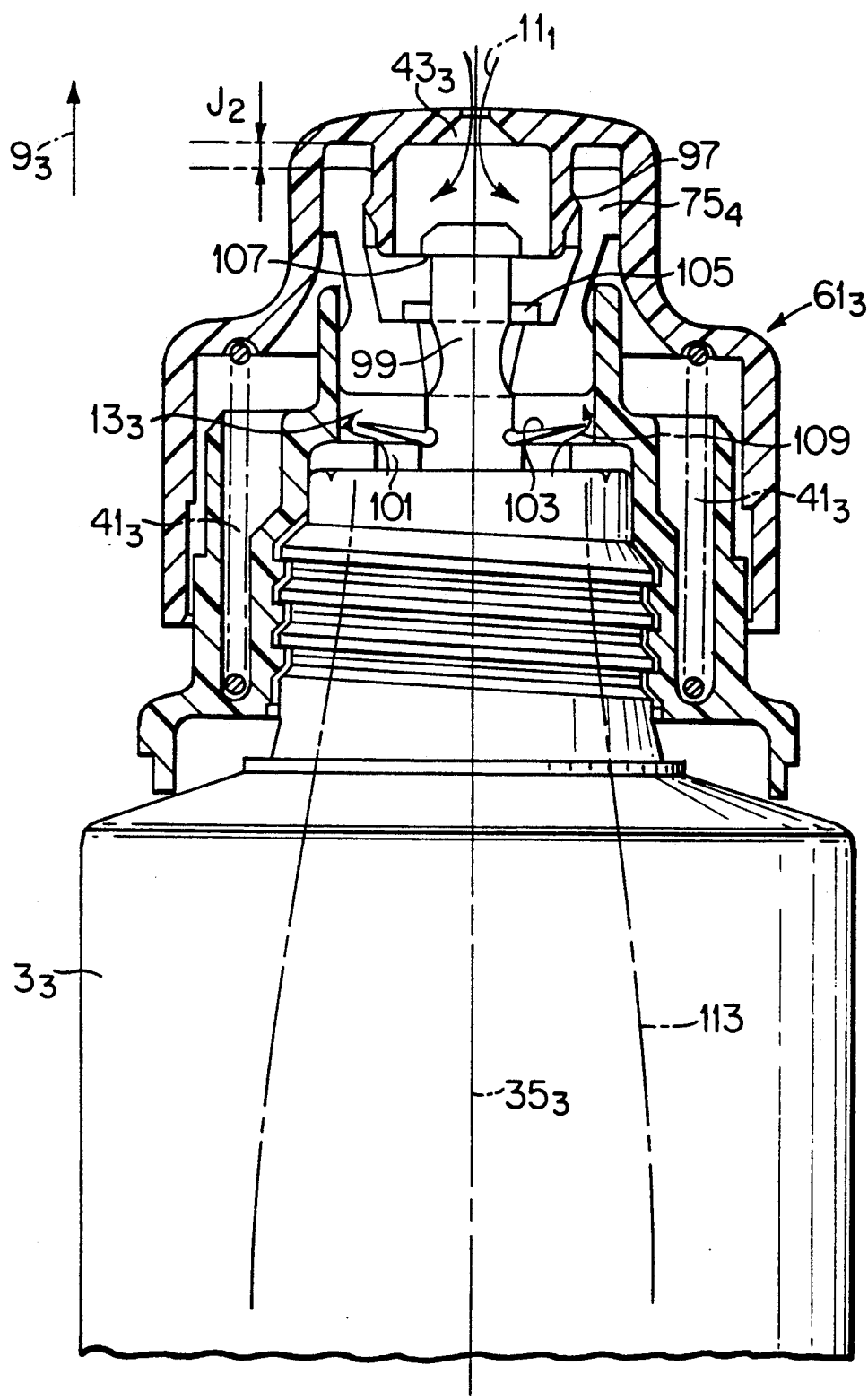

Other features and advantages of the invention will become more apparent from the following description, given with reference to the accompanying drawings which are given solely as non-limitative examples, in which:

FIG. 1 is a central cross-section of a first embodiment of the dispensing and dosing device of the invention in place on a receptacle, FIG. 2 is a face-on view of the valve used in the invention for the selective entry of the product into the dosing chamber of the device shown in FIG. 1, FIG. 3 is a view of the central part of the movable part of the device, in the direction of arrow III of FIG. 1, with a partial cross-section of the fixed part which surrounds it, FIG. 4 shows as two coupled external half-views, on the left, a view comparable with that of the device of FIG. 1 in the "high" position and, on the right, the same part in the "low" position retained in this position by a protective cap, FIGS. 5 and 6 show, each in central cross-section, the principle of operation of the device of the preceding figures, FIG. 7 is a central cross-section of a first variant embodiment of the dispensing-dosing device of the invention, FIG. 8 gives the same view of another variant embodiment, FIGS. 9 and 10 give, still with the same view in cross-section, two illustrations of the structure and of the principle of operation of a third variant embodiment of the device of the invention, and FIG. 11 shows a modification of the device making it possible to dispense at will a complete or partial dose of product.

Firstly, we shall concern ourselves with FIG. 1 which shows, then, a device 1 intended to perform both the dispensing and the dosing of a product such as for example, a cosmetic cream or an after-shave balm contained in a receptacle 3 which may in particular be constituted by a bottle having a wall of relatively supple and deformable plastic material provided with a neck with an aperture 4.

One advantage of the device 1 is that it comprises a slide system associated with a first shutter or valve 7, so that, for a first movement of this slide system in the direction of the arrow 9, a movable part 11 uncovers a dosing chamber 13 which communicates with the inside of the receptacle 3 through its aperture 4, via the valve 7 which has a movable tongue, the reverse translation movement of the system, (in the direction of the arrow 15) producing on the other hand the application of a pressure on the dose of product (contained in the chamber 13) which then comes to flatten the valve in virtually leaktight manner against the periphery of the aperture 4, closing off the return towards the receptacle, the system simultaneously uncovering a passage for dispensing to the user the dose contained in the chamber whose volume at the end of movement is practically zero.

In the version shown, it will be noted that the slide system comprises a fixed part 19 having a tapping 21 for screwing the device onto the threaded neck of the receptacle 3, the wall which bears the tapping continuing beyond and as an upper part through a step 23 enabling the periphery of the first valve 7 to be tightly "sandwiched" between this step and the lip 25 of the neck.

It will further be noted that the movable part may be of a design comprising essentially a piston 27 movable in translation in the direction of arrows 9 and 15 with respect to the fixed part 19, between a first position where the piston totally disengages the volume of the chamber 13 and closes the passage 17, and a second position where this same piston reduces the volume of this same chamber 13 to the minimum, thus uncovering the said passage 17, while closing the first valve 7.

For its movement in translation, the piston 27 is guided by an internal wall 29 of the fixed part forming a slide penetrating more or less into an opening 31 of the movable part whose guiding is supplemented by a peripheral wall 33 of the same fixed part which extends in the general axial direction 35 of translation of the movable part, in sliding contact with the widest terminal part 37 of the latter.

Between this wall 33 and the internal wall which bears the tapping 21, the fixed part 19 may have an opening 39 adapted to receive a spring 41 bearing on one side against the bottom of the o en on the other against an internal annular surface 42 of the movable part 11, so as to ensure the return of the latter towards its "first" position where the chamber 13 offers its entire dosing volume. However, it will be noted that the use of such a return means is not essential.

For a dispensing deemed satisfactory during tests, provisions may be made for the passage 17 to consist of one or more channels formed inside the piston 27 and opening on one side to the outside for example through a single orifice 43 and communicating, on the other, with the chamber 13 through the intermediary of a series of orifices 45 made transversely with respect to the direction of translation 35 of the piston on the periphery of the latter close to its end which penetrates into the chamber.

At this end, the piston will moreover be shaped so as to terminate with a solid frontal wall 47 forming a second valve and may have a diameter slightly greater than that of the rest of the piston, so as to present a peripheral step 47a adapted to interact with a complementary transverse step 49 of the wall 29, forming a seating when the piston is in the first position, thus hiding the orifices 45.

In FIG. 3, it will be noted that the wall 47 which is here perpendicular to axis 35, may have peripherally a series of calibrated cut-outs 51 for the circulation of the product.

We shall concern ourselves now with FIG. 4 to note that a detachable packaging cap 53 may top the whole of the device, covering both the movable part 11 and the fixed part 19.

Provisions may be made for example for this cap 53 to be able to interact by a "forcible" engagement with a peripheral bead 55 formed at the base of the fixed part 19 so that the cap can bear against a step 57 formed at the base of the neck of the receptacle while driving (in the direction of the arrow 15 of FIG. 1) the movable part 11 towards its "second" position where the dosing chamber 13 has its minimum volume.

In FIG. 4, it will also be noted that the cap 53 may comprise an inner protective stud 59 adapted to blank off the open end of the channel 17.

It will further be noted that externally the movable part 11 will advantageously have a peripheral swelling or transverse step 61 of relatively gentle curvature which enables it to be grasped in the user's hand and support his fingers with a view to its operation.

With reference to FIGS. 5 and 6, the principle of operation of the device which has just been described will now be briefly set forth.

As a preliminary, it will be noted, however, that the inside of the piston 27 (which constitutes a chamber 63) is shaped differently in these two figures and in FIG. 1 where the passage 17 is constituted by a simple channel of small volume.

Be this as it may, the operation of the device is as follows: the movable part 11 will be assumed to be in the "high" position (FIG. 5) with its piston 27 in the "first" position disengaging totally the dosing chamber 13 and hiding the orifices 45 behind the terminal upper part 29a of the peripheral wall 29 of this chamber.

If the receptacle 3 is pressed "by squeezing it" for example as indicated by the arrows 65, a certain quantity of product is made to pass towards the chamber 13, by raising the valve tongue in passing. (It will be noted that if the device were not provided with any return spring 41, the piston starting from its "low" position would naturally be pushed towards its "high" position of FIG. 5 by the pressure of the product entering the chamber 13).

Once the chamber 13 is filled, in order to obtain the restitution of the dosed quantity of product, it is then sufficient (see FIG. 6) to press on the push 11 (arrow 67) in order for the piston to be driven here downwards, into its second position, and to cause, by pressure on the product, the leaktight bearing of the tongue of the valve 7 against its seating, while simultaneously uncovering the orifices 45, this producing the delivery of the product through the dispensing orifice 43 (arrow 69).

For a new dispensing action, it is sufficient to release the movable part 11 which either is returned to the first high position under the effect of the return spring 41, or (in the absence of a spring) remains in the low position, a new pressure on the receptacle 3 then driving it back up by refilling the chamber 13.

The version in FIG. 7 differs from that of the preceding figures particularly in that here the movable part $11_1$ comprises three parts: a stepped ring-shaped part 75 whose widened base forms a piston slidably mounted along the axis $35_1$ in the dosing chamber $13_1$, which is limited externally by the upper cylindrical axial wall $29_1$ of the fixed part $19_1$; the swollen outer push $61_1$ which is extended locally and internally, in the axis $35_1$, in the direction of the part 75 by a hollow cylindrical part 73. The part 73 is open at its inner free end $73_1$ so as to guide externally the less wide upper part $75_1$ of the piston which is driven internally in its axial translation movements through the intermediary of a central third part, 77, elongate in the direction of the axis $35_1$ of movement of the piston through whose central orifice 76 it passes, being capable of sliding therein. The control part 77 has an upper part $77_1$ fixed (for example screwed) around the central delivery orifice $43_1$ of the push and a lower part $77_2$ offering a solid transverse wall 79 forming a second valve so as to blank off the central orifice 76 of the piston from the start to the finish of the first movement for refilling the dosing chamber (arrow $9_1$), while allowing, during the second movement of this same piston (in the direction of the arrow $15_1$), a passage of product from the dosing chamber to the outside, through the same orifice 76.

In order to guide the product to the outside, the part 77 may be connected to an axial tube open at the upper part onto the orifice $43_1$, but closed at the lower part by the wall of value 79, which advantageously will have, so as to perform its valve function, a peripheral step capable of bearing, on the side of the chamber $13_1$, against a step forming a seating 81 of the piston, which at this place will have a clearance having a truncated conical wall 82.

Just behind value wall 79, the tube 77 may have, as in the case of the preceding figures, communication orifices $45_1$ which are transverse to the axis $35_1$ and communicating on one side with the inside of the tube for the passage of the product and, on the other, with the chamber $13_1$, (when the wall forming the valve 79 is not bearing against the seating).

For leaktightness, seals 83, 85 are provided on the one hand at the place of the sliding connection between the piston and the guiding wall $29_1$ which surrounds it and, on the other hand, between the upper part $75_1$ of this same piston and the periphery of the tube 77, just above the orifices $45_1$ in FIG. 7.

In this same Figure, it will be noted that a clearance $J_1$ has been left, in the axis $35_1$, between the push (and more particularly its internal extension part 73) and the said piston, so that at the start of the first and second movements, the piston is driven solely after the clearance $J_1$ has been taken up, this by axial movement of the push to which the piston is thus mechanically linked although the latter is structurally separate therefrom.

For the relative operation of the push and of the piston, a helical spring 86 is disposed at the place of the volume reserved between the tube 77 and the wall 73, so that this spring bears on one side against the push and on the other against the top of the piston. In this manner, in the absence of any load, the clearance, $J_1$ will naturally be maintained and the valve wall 79 will be closed.

In other respects, the second variant embodiment of FIG. 7 is closely comparable with that of FIGS. 1 to 6. In this connection it will simply be noted that in this case, in FIG. 7, the return spring (referenced 41 in FIG. 1) of the push $61_1$ has not been fitted.

Briefly, the operation of the device of this FIG. 7 is as follows: the push and the piston are in the first position, the high position as in FIG. 7. The dosing chamber $13_1$ is assumed to be full. A pressure on the push in the direction of the arrow $15_1$ causes firstly the taking up of the clearance $J_1$ with compression of the spring 86 and opening of the valve wall 79, thus disengaging the orifices $45_1$. As the movement continues, the piston is driven downwards by the lower end of the part 73 and by the step 87 of the tube 77, thus compressing the product contained in the dosing chamber. Since this product cannot return towards the receptacle because the first clack valve $7_1$ is closed, it is thus forced, via the orifices $45_1$ towards the inside of the tube 77 so as finally to emerge on the outside through the axial orifice $43_1$ of the push. The descent of the piston terminates when it abuts by its periphery against the fixed part of the periphery of the valve $7_1$.

If it is desired for a dose of product then to have a tendency to be sucked from the receptacle $3_1$ towards the dosing chamber, a spring would then have to be provided such as that 41 of FIG. 1, so that the push is activated in its upward movement in the direction of the arrow $9_1$ and causes, by virtue of the closure of the valve 79 under the effect of the spring 86, the suction of the product with opening of the valve $7_1$.

If no spring such as 41 has been provided, the push $61_1$ will conversely remain in the low position and it is only under the effect of a compression of the receptacle, for example in the direction of the arrows 89, that the pressure of the product will tend to push back the first valve $7_1$, thus producing a passage of product towards the dosing chamber by pushing the valve wall 79 and therefore the tube 77, thus driving the piston and the push in the direction in parallel manner of the arrow $9_1$ far as the high position of FIG. 7. With such an operation (with no return spring of the push), the user can thus ascertain "at sight" whether the dosing chamber is full or empty and he will act accordingly.

In the figures described hitherto, it will have been noted that the product is dispensed axially.

However, it is possible to envisage a transverse or lateral dispensing action of the type used in shaving foam aerosols.

Such a variant embodiment has been devised in FIG. 8.

The sole difference with the version of FIG. 7 consists in the shape of the push here referenced $61_2$ and in the shape and in the orientation of the product delivery passage $43_2$ which passes through it.

In this case, the push $61_2$ is swollen, with its outer step 91, over only part of its periphery so as to present on the opposite side a sloping upper wall 93.

In order to operate the push $61_2$ which will still be movable in translation with the piston $75_2$ in the axis $35_2$ of the receptacle $3_2$, it will be possible to act on the transverse wall 93 or on the lateral step 91 alike, the product which leaves the guiding tube $77_2$ being deflected laterally by the angled channel $43_2$ so as to emerge on the side, as indicated by the arrow 95.

In FIG. 8, it will be further noted that inside the receptacle $3_2$ has here been disposed a deformable bag 96 containing the product to be dispensed and for example constructed of polyethylene, the part $3_2$ then forming only, an external packaging part.

The version in FIGS. 9 and 10 combines the principles of dispensing with dosing and pumping.

If it is compared with the preceding versions and more particularly with those of FIGS. 1 to 7, it will be noted that the movable part $11_3$ now comprises two parts: the swollen external push $61_3$ and an intermediate part forming at its base a piston, $75_3$, extended at the upper part by a substantially truncated conical flared driving part $75_4$ retained in an annular clearance $31_3$ inside the push by catches 97 formed on the internal extension $73_3$ of the push, so as nevertheless to allow a slight axial travel $J_2$ between the push and the part $75_4$ of the piston.

As regards to the fixed part $19_3$, this comprises, besides the detachable unit for attachment to the receptacle $3_3$ with its upper extension walls $29_3$ which limit the dosing chamber $13_3$ externally and between which walls slides the piston $75_3$, a central foot 99 which rises, in the dosing chamber, and in the axis $35_3$ of movement of the piston from a base plate $99_1$ placed facing the aperture of the receptacle.

The plate $99_1$ has passing through it orifices 101 for the passage towards the chamber $13_3$ of the product contained in the receptacle.

The first valve disposed at the level of the outlet from the receptacle is here constituted by a series of tongues 103 articulated at the base of the foot 99, facing the orifices 101, so as to cover them or uncover them.

Around the foot 99, extends the piston $75_3$ with such a clearance that it can slide along the foot allowing, during its descent (second movement in the direction of the arrow $15_3$), the passage of the product between the foot and the piston (axial central orifice $75_5$)

Beyond the piston, the foot 99 is then surrounded by a ring 105 forming a second valve and slidably mounted around the said foot, its translation towards the free end of the foot being limited by the upper peripheral step 107 of the foot.

In practice, the valve ring 105 will be able to slide along the foot between two extreme positions, an upper position (FIG. 9) and lower position (FIG. 10) respectively.

In the two FIGS. 9 and 10, the presence will further be noted of a spring $41_3$ for returning the push towards its high position shown in FIG. 9, as well as the intended "axial" dispensing of the product, even though it would have been perfectly possible to envisage adapting to this version the lateral dispensing principle of FIG. 8.

The embodiment of FIGS. 9 and 10 operates as follows: the piston is in the high position (FIG. 9). The dosing chamber is assumed to be full. A pressure on the push in the direction of the arrow $15_3$ serves firstly to take up the axial clearance $J_2$ and then to drive the piston $75_3$ in translation in the axis $35_3$. The descent of the piston compresses the product contained in the chamber $13_3$ which cannot return towards the receptacle, the tongues 103 forming a screen. The product is therefore compelled to pass through the passage $75_5$ so as to emerge onto the outlet $43_3$ via the internal volume 74 which is limited externally by the annular wall $73_3$ of the . push completely open at its base. This circulation of the product keeps the second valve ring 105 in the high position, blocked against the step 107 of the foot 99.

Once the travel of the piston is complete, the chamber $13_3$ has released its dose of product. Since the product is no longer forced towards the outside, the valve ring 105 then descends naturally (supposing the receptacle is held substantially vertically the right way up) until it abuts against the top part of the piston $75_3$ (see FIG. 10). Release of the push $61_3$ then causes the latter to rise in the direction of the arrow $9_3$, under the action of the return spring(s) $41_3$. Once the clearance $J_2$ has been taken up, the catches 97 drive the piston in their movement, via its driving extension $75_4$. The rising of the piston (the valve ring 105 being closed) then causes (if suitable dimensions have been respected) a pumping by suction of the product which may be contained in the receptacle $31_3$, this through opening of the tongues 103 of the first valve (see arrows 109 of FIG. 10). Thus, a new dose of product progressively fills, by suction, the dosing chamber. In the high position (FIG. 9), the travels of the piston and of the push are blocked in particular by the step 107 for stopping the valve ring 105 which still closes off the outlet of the passage $75_5$. A new dose of product is then ready to be dispensed.

In FIG. 10, it will be noted that the outlet orifice $43_3$ has a truncated conical shape converging progressively towards the outside.

In this manner, and by virtue of the above-mentioned pumping effect, an effect of suction "to the last drop" will tend to be produced, at the level of the orifice $43_3$ when the piston rises, as shown diagrammatically by the arrows 111.

It will again be noted that it is perfectly possible for the receptacle to be rigid and to constitute a simple packaging element for a deformable leaktight inner bag 113, for example of plastic material (P.E.) initially filled with product and whose volume would be diminished progressively as this product was dispensed.

FIG. 11 shows diagrammatically an embodiment of the fixed and movable parts of the device making it possible to dispense a complete or partial (for example half) dose of the product, depending on the orientation in rotation in the axis 35 of the movable part which forms the stopper 11, with respect to the fixed part 19. For this, the stopper 11 has internally, as an overthickness of its lateral wall, two protuberances 115, elongated and parallel with the axis 35 and shaped so as to slide in interacting cutaways 117, made externally in part of the thickness of the lateral wall 29 of the fixed part. In this case, the cutaways 117 have a step defining upper stops $119a$ and lower stops $119b$, limiting at two different levels the axial travel of the stopper 11. Thus, depending on whether the protuberances 115 are located facing the stops $119a$ or $119b$, a dose or a partial dose of product can be dispensed.

We claim:

1. Device for dispensing and dosing a product contained in a receptacle having a product outlet aperture where the device is placed, which comprises:

a first valve disposed across the aperture of the receptacle, a slide system comprising a fixed part and a movable part which penetrates into a zone of the fixed part and defining a chamber for dosing the product, the movable part being a piston which is movable in the zone of the fixed part and has passing through it a passage for discharge of the product thus allowing the dosing chamber to communicate with the outside;

a first movement of the said piston opening the first valve, thus allowing the product to pass from the receptacle to the dosing chamber, a second movement of the piston in reverse of the first, exerting a pressure on the product contained in said dosing chamber thus forcing this product towards the discharge passage while prohibiting its return to the receptacle by closure of the first valve;

a second valve associated with said piston for opening the communication between the dosing chamber and the outside of the time of the second movement of the piston and for closing this communication at the tie of the first reverse movement, thus creating in the course of this first movement pumping, towards the dosing chamber, of the product contained in the receptacle;

means for resiliently activating the movable part, returning the piston in the direction of the first movement;

the movable part including:

(a) an external member surrounding the fixed part and translating along the axis of movement of the piston, and extending internally by a zone for driving and for guiding the piston in translation;

(b) the piston which is structurally dissociated form the external member but is mechanically linked to it for its movement in the same direction, according to the first or second movements; and the fixed part additionally including a central foot rising in the dosing chamber, parallel to the axis of movement of the piston, from a base plate, to face the aperture of the receptacle, this plate having passing through it at least one orifice for passage of the product, the orifice facing the first valve, the latter located around the base of the said foot, along which the piston is slidably mounted, with a clearance, allowing at the time of the second movement the circulation of the product from the dosing chamber to the discharge passage, a free end of the said foot being surrounding by a ring slidably mounted around the foot so as to form the second valve.

2. A device for dispensing and dosing a product contained in a receptacle having an outlet aperture upon which the device is mounted, the device comprising:

a first valve disposed over the aperture;

a slide system having a fixed part and a movable part which penetrates into a zone of the fixed part, the zone outwardly defining a chamber for dispensing a dose of the product, the system including a piston which is movable in the zone which includes a discharge passage passing therethrough, allowing the chamber to communicate with the outside;

a first movement of the piston opening the first valve to allow dosed product to be dispensed from the receptacle to the dosing chamber;

a second movement of the piston being in a reverse direction from the first movement and pressurizing the product contained in the chamber thereby forcing the product to be dispensed to the discharge passage while checking return of product to the receptacle by closure of the first valve;

a second valve associated with the piston for closing the communication through the discharge passage, at least at the end of the first piston movement, while opening the communication during the second piston movement; and means for delivering a complete for partial dose of product contained in the dosing chamber.

3. Device according to claim 1 or claim 2 in which, after use, the movable part of the slide system is topped by a detachable protective cap, locked onto the device when the said movable part is substantially at the end of the second movement, thus limiting the volume of the dosing chamber to the minimum.

4. Device according to claim 1 or claim 2 in which a clearance in the direction of movement of the piston is reserved between a member surrounding the fixed part and the piston so that at the start of the first and second movements, the piston is driven in movement through the intermediary of the member only after this clearance has been reduced by axial movement of the member.

5. The device set forth in claim 1 together with means for delivering a complete or partial dose of product contained in the dosing chamber.

* * * * *